June 28, 1927.
H. R. STRAIGHT
1,633,829
TUNNEL KILN
Filed May 8, 1925
2 Sheets-Sheet 1
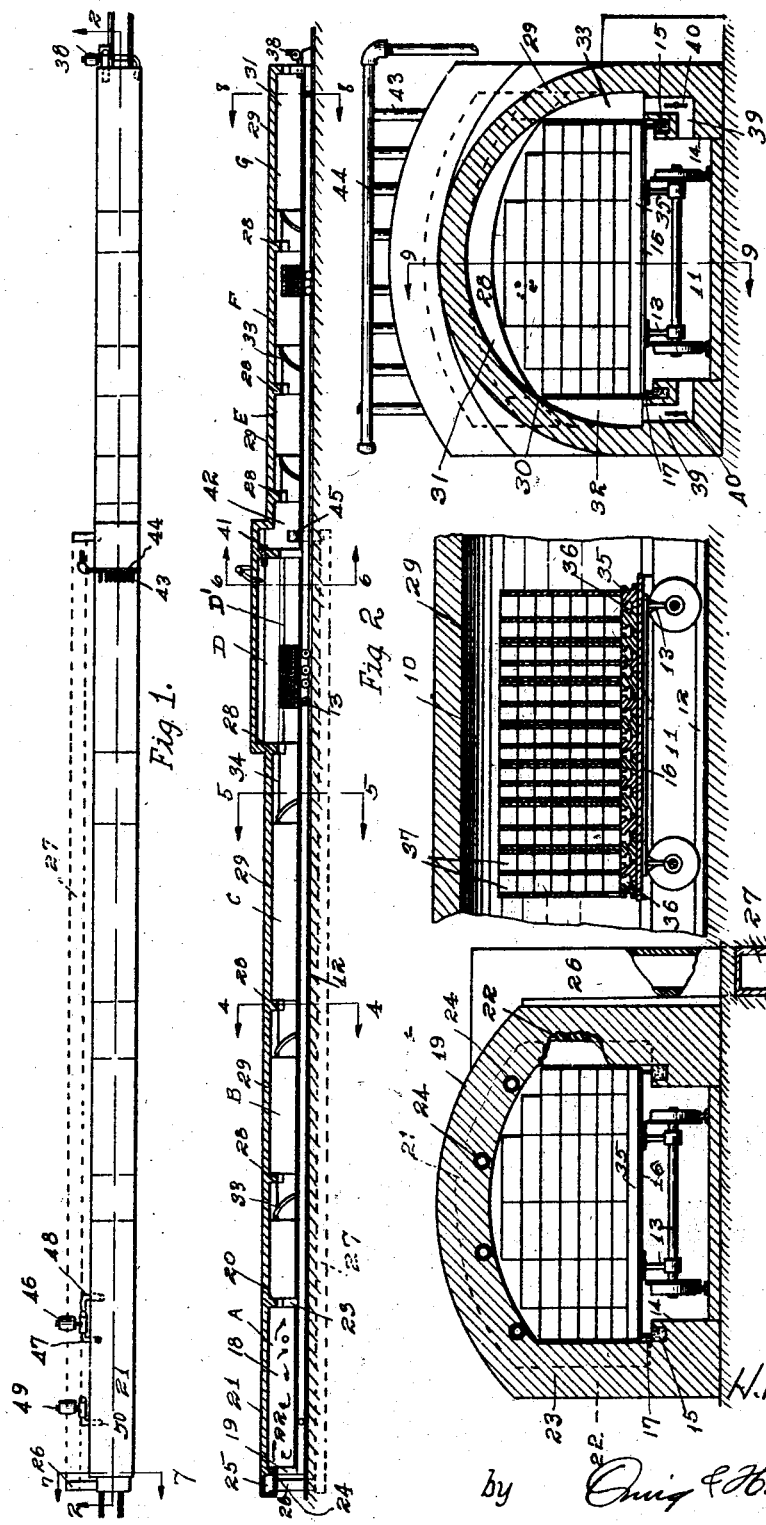
Inventor
H.R. Straight
by Craig & Hague Attys June 28, 1927.
H. R. STRAIGHT
TUNNEL KILN
Filed May 8, 1925
1,633,829
2 Sheets-Sheet 2
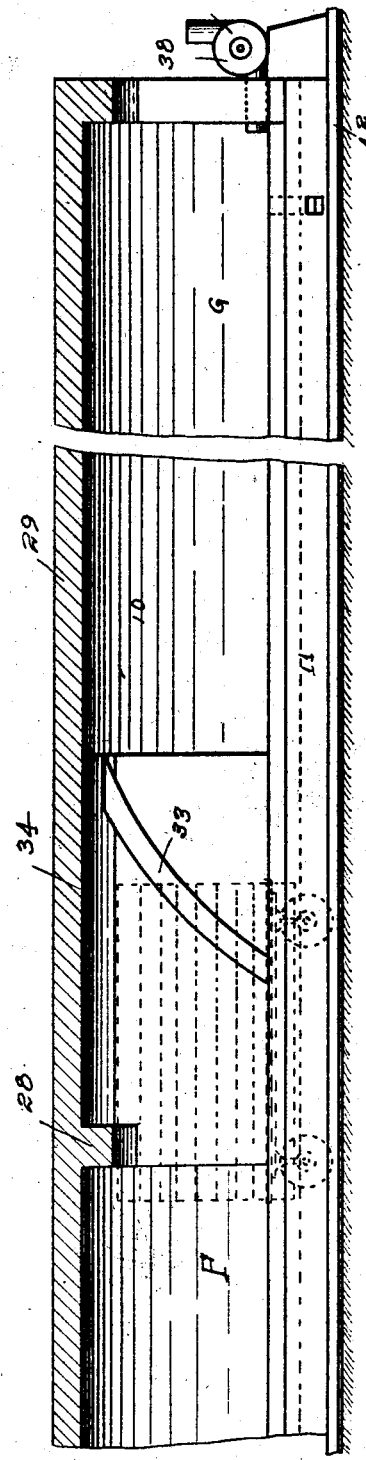
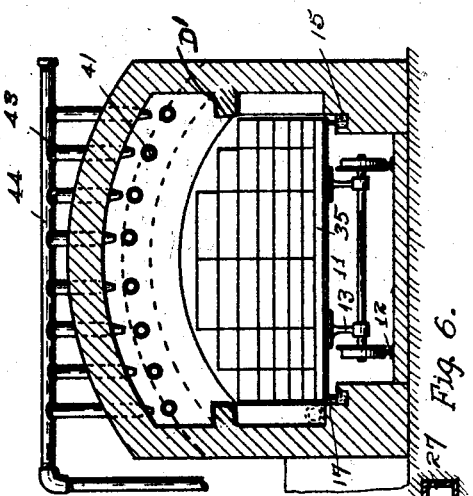
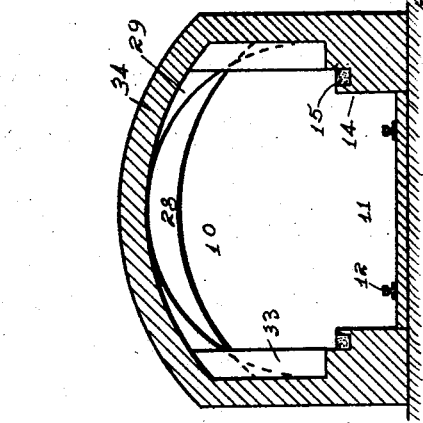
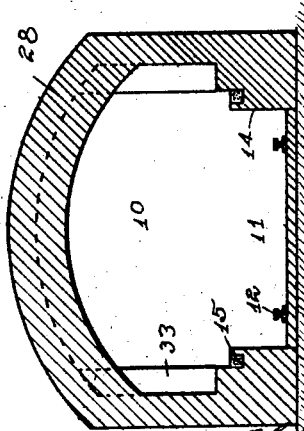
Inventor
H. R. Straight
by Drury & Hague, Attys.

Patented June 28, 1927.

1,633,829

UNITED STATES PATENT OFFICE.

HALVER R. STRAIGHT, OF ADEL, IOWA.

TUNNEL KILN.

Application filed May 8, 1925. Serial No. 28,848.

The object of my invention is to provide a tunnel kiln of simple, durable and inexpensive construction, so constructed and arranged that ware bearing cars having unburned material may be caused to enter one end of the kiln and to be intermittently advanced through it, and when it has been discharged from the opposite end of the kiln the ware will have been burned and cooled, the kiln being so constructed and arranged that the length of time in which it is required for the burning and cooling operation will be materially reduced.

A further object is to provide a tunnel kiln having a series of burning and cooling zones, the kiln being so constructed and arranged that as the ware is advanced through the kiln, the ware will first be preheated, then as the ware is advanced the temperature will be rapidly raised until it has reached the point at which oxidation and vitrification take place, and on further advancement of the car the ware will rapidly become cooled, by circulating air through the ware at atmospheric temperature, a portion of the heated air from said cooling process being utilized to perform the preheating operation.

A further object is to provide improved means for circulating the heating medium in the preheating zone.

A further object is to provide an improved method of controlling and circulating the combustible materials in the combustion chamber.

A further object is to provide a tunnel kiln having a preheating zone, a combustion zone and a cooling zone, and means for introducing air at atmospheric temperatures for cooling the ware, the air being designed to move through the ware in a series of progressive stages with the air passing upwardly through the ware in each stage, a portion of the heated air being used to assist in completing combustion, while another portion of the heated air is being used for preheating purposes, the products of combustion being utilized to gradually increase the temperature of the ware after it has passed the preheating stage, the parts being so arranged that the said products of combustion will be moved through the ware in sucessive stages and in a downward direction.

A further object is to provide in a tunnel kiln, an improved wall construction including a series of arches so arranged that the interior of the kiln may be formed into a series of zones or compartments.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of my improved tunnel kiln.

Figure 2 is a longitudinal sectional view taken on the line 2—2 of Figure 1.

Figure 3 is an enlarged, detail, longitudinal, sectional view of the right hand end of said kiln.

Figure 4 is a transverse sectional view taken on the line 4—4 of Figure 2.

Figure 5 is a transverse sectional view taken on the line 5—5 of Figure 2.

Figure 6 is a transverse sectional view taken on the line 6—6 of Figure 2.

Figure 7 is a transverse sectional view taken on the line 7—7 of Figure 1.

Figure 8 is a transverse sectional view taken on the line 8—8 of Figure 2.

Figure 9 is a longitudinal sectional view taken through a segmental portion of the kiln on the line 9—9 of Figure 8.

My improved kiln is constructed in the form of a tunnel which comprises a series of adjacent arches formed of masonry, the arches being so formed that a continuous passage 10 is provided throughout the length of the kiln, the passage 10 being provided with a contracted portion 11, the bottom of which is provided with a pair of rails 12. Said rails 12 are designed to carry a series of ware bearing cars 13, which are so constructed that they may be placed end to end and moved through the kiln in an intermittent and continuous manner. The sides of the portion 11 are provided with vertical walls 14, the upper edge of each of said walls being provided with a horizontal groove 15 which is filled with loose material such as sand. The floor 16 of the car 13 is of a width almost equal to the distance between the outer edges of the grooves 15, the edges of said floor 16 being provided with a downwardly extending plate 17 which extends into the grooves 15 in such a manner that an air trap is provided so that two distinct passageways are formed, one above the floor 16 designated by the numeral 10, and the other below the floor 16 designated by the numeral 11. Thus it will be seen that two independent currents of air may be moved through the kiln at different pressures if so desired.

At the inlet or left hand end of the kiln as viewed in Figures 1 and 2, I have provided what I shall term the preheating zone which is in the form of a rectangular chamber 18 having at each end drop arches 19 and 20, the space between said drop arches being connected by an arch 21. The inner line of the arch 21 is indicated by dotted lines in Figure 7. The arch 21 is supported on upright wall members 22, while the arches 19 and 20 are supported on pillars 23. The pillars 23 are of such thickness that their inner edges will lie adjacent to the outer edges of the car floor 16 and adjacent to ware stacked thereon, as clearly shown in Figure 7. The top of the pile of ware on the car is so stacked that it will fit the contour of the lower edges of the drop arches 19 and 20, as clearly shown in Figures 7 and 8.

The drop arch 19 is provided with a series of nozzles 24 having their inner ends extending into the preheating chamber 18 and their outer ends extending into an auxiliary air chamber 25. One end of the chamber 25 is provided with a downwardly extending pipe 26 leading to an air passage 27 which is mounted beneath the floor line of the kiln and runs longitudinally with one side as shown in dotted lines in Figure 1.

The kiln is provided with a series of drop arches 28 which are spaced apart a considerable distance and arranged to divide the kiln into a series of sections or compartments designated by the characters "A", "B", "C", "D", "E", "F" and "G". The sections "A", "B" and "C" comprise heating zones or that portion of the kiln where the temperature of the ware is rapidly increased, each of the sections being provided with an arch 29, said arches being substantially in the shape of a semi-cylindrical shell, the base of the arch being on a line substantially level with the top of the floor 16 of the cars. The arch is so shaped that the corners of the pile of ware will nearly engage the arch at the point 30, as shown in Figure 8. The arch 29 it will be seen is of a different curvature from the drop arch 28, so that a space or compartment 31 is provided above the ware, and a space or compartment 32 is provided at each side of the ware, the point 30 being the intersection of the planes of the arches 28 and 29.

The compartments 32 are subdivided by means of curved division members 33. Adjacent to one end of each of the arches 29 is an arch portion 34 which is substantially concentric with the arch 28 and so arranged that a space is provided above the ware which communicates with the spaces 32 so the arches 29 and 34, together with the curved members 33, subdivide each of the sections "A" "B" "C" "E" "F" and "G" into two sections, one in which the spaces 31 and 32 are formed and the other in which a space extends over the top of the ware and down the sides of the ware.

It will be seen from Figure 2 that the curved plates 33 in the left hand end of the tunnel are curved in the opposite direction from those in the right hand end of the tunnel. The sections "A" "B" and "C" form the heating zones while the sections "E" "F" and "G" form cooling zones, and the compartment "D" forms the zone in which the oxidation and vitrification take place and the zone in which the combustion also takes place.

The floor 16 of each of the cars 13 is provided with a series of tiles 35 formed of fire clay having transversely arranged grooves 36, said grooves being open at their ends and also at their top edge. The ends of the groove 36 communicate with the bottom of the compartments 32. The ware is stacked on top of the tiles 35 in such a manner that vertical passages 37 are formed. Each of the grooves 36 communicate with one or more of the passages 37, as clearly shown in Figure 9. It will be seen that air may be caused to enter the grooves 36 from their ends and to pass upwardly through said passages 37, or it may move in the opposite direction downwardly through said passages 37 and out through the ends of the grooves 36.

The compartment 32 of section "G" is provided with a blower 38 by means of which air pressure may be delivered to the said compartments 32. The passages 39 are provided which communicate with both the compartments 32 and the compartments 11. Each passage 39 is provided with a damper 40.

The right hand drop arch of section "D" is provided with a series of horizontally arranged nozzles 41, one end of which extends into the said section "D" while the opposite end of said nozzles communicate with a chamber 42 adjacent to the inner end of section "E". In the top portion of section "D" is provided a series of downwardly projecting fuel supplying nozzles 43, all of which are connected with a common supply pipe 44. One nozzle 43 is provided for one of the nozzles 41, each pair of nozzles being mounted in a common vertical plane. The side walls of said section "D" are provided with division shelves D' which are adjacent to the top of the ware in said section.

The inner end of the passage 27 is caused to communicate with the compartment 42 through an opening 45 in the side wall of said compartment. A suction fan 46 is provided near the left hand end of the kiln having the pipe 47 communicating with the preheating chamber 22 and a pipe 48 communicating with the chamber of section "A". A blower fan 49 is provided with a pipe 50 which also communicates with the preheating chamber 22. Means is provided at each end of the kiln for closing the ends of the tunnel during the time the cars are at rest in the kiln. These closing devices are not illustrated in the drawings.

Assuming that the kiln has been filled with cars of ware, and that fuel is being supplied to the pipes 43, and that the blowers are in operation, and that the temperature of the kiln has been brought to its operative points, cold air will be introduced through the blowers 38 and 49 and the air which enters through the blower 49 will travel longitudinally beneath the bottoms 16 of the cars 13 to the passages 39 to the compartments 32 in section "G" to cool said cars and to absorb waste heat. The amount of air passing through the passages 39 may be regulated by the dampers 40. The air introduced by the blowers 38 will be delivered directly to the compartment 32 of section "G" and will pass longitudinally through the passages 36 of the car floors and thence upwardly through the passages 37 to the compartment beneath the arch 29, and will travel forwardly over the top of the ware, beneath the arch 34 and into the forward section of compartment 32, beneath the outer ends of the drop arch 28 into the compartments 32 of section "F", where it will again travel horizontally through the passages 36 and upwardly through the passages 37 beneath the arch 29 of section "F", and again move forwardly to the position beneath the arch 34 of section "F" and again downwardly adjacent to the ends of the ware beneath the second drop arch 28 into section "E". This air movement will continue in a similar manner for each section, the air becoming hotter as it is advanced forwardly.

It will be seen that as the cold air comes in contact with the hot ware, the air would naturally raise to the chamber above. By this arrangement a natural draft is maintained for cooling the ware. The heated gases are delivered to the chamber 42 under considerable pressure, a portion of which is forced through the nozzles 41 where it is delivered directly into engagement with the fuel as it enters from the nozzles 43.

Section "D" is provided with a considerable space above the ware and a smaller space at each end. It will be seen that a blast of heated gases will be forced in horizontally above the top of the ware in section "D", and that an eddy current will be produced in such manner that the gases of said eddy current in the forward end of section "D" will pass downwardly through the passages 37 and outwardly through the passages 36 into said end spaces and then inwardly through the passages 36 near the rear end of section "D", and then upwardly through the passages 37.

Thus it will be seen that an eddy current, rotating generally in an anti-clockwise direction, will be produced, under the main blast, having a considerably less amount of oxygen than the main blast, due to the fact that as the products of combustion of the main blast travel downwardly through the ware, at the forward end of the combustion chamber, a considerable amount of oxygen will be taken up by the ware, the ware at the forward end of the combustion chamber being somewhat deprived of the oxygen. I find that this is quite advantageous, as it enables me to produce a better flash finish which is usually quite difficult to perform in tunnel kilns. It will be seen that a considerable amount of heat will be radiated downwardly from the arch above the nozzles. It is understood, of course that the ware is being advanced through the said compartment in a continuous manner.

A portion of the products of combustion in section "D" will enter section "C" and be circulated through the ware in the same manner as for sections "E" "F" and "G", with the exception that its movement is reversed, the gases passing downwardly through the passages 37 and horizontally and outwardly through the passages 36. The air and products of combustion in this case are gradually getting cooler as they are advanced toward the forward end of the kiln, which are finally exhausted through the pipe 48 of the fan 46.

A portion of the heated air from the compartment 42 is delivered to the chamber 25 under pressure and is discharged through the nozzles 24 into the chamber 22 above the ware in a manner somewhat similar to that described for section "D", the nozzles causing an eddy current, which will be rotated in a clockwise direction as shown in Figure 2. This heated air causes the tile to become thoroughly dried, and the ware to be brought to a considerable temperature before it is engaged by the heated products of combustion from section "D".

It will be seen that I have provided a kiln of comparatively simple construction which will efficiently burn the ware, and one in which the temperatures may be rapidly increased and decreased without causing cracking strain on the ware, due to the fact that the heating and cooling mediums are uniformly applied thereto, and also due to the fact that sections "A" "B" "C" "D" "E" "F" and "G" may be made of such lengths that the temperatures of a given section may be rapidly increased by shortening said sections, or the speed of cooling increased by shortening the lengths of the section. It being understood that at certain points in the operation the temperature may be very rapidly increased, while at other points the temperature must be very slowly increased, thereby enabling the kiln to be made just long enough to get the proper temperature variations and thereby eliminating a considerable length of time in burning which would otherwise be lost.

I claim as my invention:

1. In combination, a kiln tunnel, a series of ware bearing cars adapted to travel longitudinally through said tunnel, each of said cars being provided with a fire proof floor having a series of horizontally arranged grooves in its upper surface, said car floor being designed to support and carry ware to be burned, said ware being arranged so as to form vertical passages having their lower ends communicating with said horizontal grooves of said floor, means for forcing a cooling medium through said horizontal passages from each end and thence upwardly through the vertical passages as the ware is being cooled.

2. In combination, a kiln tunnel, a series of ware bearing cars adapted to travel longitudinally through said tunnel, each of said cars being provided with a fire proof floor having a series of horizontally arranged grooves in its upper surface, said car floor being designed to support and carry ware to be burned, said ware being arranged so as to form vertical passages having their lower ends communicating with said horizontal grooves of said floor, and means for forcing a heating medium downwardly through said vertical passages and outwardly through said horizontal passages at each end as the ware is being heated.

3. In combination, a kiln tunnel, said tunnel being divided into heating, combustion and cooling zones, a series of ware bearing cars adapted to travel longitudinally through said tunnel, each of said cars being provided with a fire proof floor having a series of horizontally arranged grooves in its upper surface, said car floor being designed to support and carry ware to be burned, said ware being arranged so as to form vertical passages having their lower ends communicating with said horizontal grooves of said floor, means located at the discharge end of said tunnel for forcing a cooling medium first through said horizontal passages, thence upwardly through said vertical passages for cooling the ware, means for delivering a portion of the heated cooling medium to said combustion chamber in a series of jets in such manner as to support combustion and to produce recirculating eddy currents in said combustion chamber by induction, means for delivering a portion of the heated products of combustion from said combustion chamber to the heating zone and first downwardly through the ware, thence outwardly through the horizontal passages of said floor, and suction means for moving onward said products of combustion in a general direction opposite to the direction of the ware movement.

4. In combination, a kiln tunnel, said tunnel being divided into preheating, heating, combustion and cooling zones, a series of ware bearing cars adapted to travel longitudinally through said tunnel, each of said cars being provided with a fire proof floor having a series of horizontally arranged grooves in its upper surface, said car floor being designed to support and carry ware to be burned, said ware being arranged so as to form vertical passages having their lower ends communicating with said horizontal grooves of said floor, means located at the discharge end of said tunnel for forcing a cooling medium first through said horizontal passages, thence upwardly through said vertical passages for cooling the ware, means for delivering a portion of the heated cooling medium to said combustion chamber in a series of jets in such manner as to support combustion and to produce recirculating eddy currents in said combustion chamber, means for delivering a portion of the heated products of combustion from said combustion chamber to the heating zone and first downwardly through the ware, thence outwardly through the horizontal passages of said floor, suction means for moving said products of combustion, and means for delivering a portion of the heated cooling medium to said preheating zone.

5. In combination, a kiln tunnel, said tunnel being divided into preheating, heating, combustion and cooling zones, a series of ware bearing cars adapted to travel longitudinally through said tunnel, each of said cars being provided with fire proof floor having a series of horizontally arranged grooves in its upper surface, said car floor being designed to support and carry ware to be burned, said ware being arranged so as to form vertical passages having their lower ends communicating with said horizontal grooves of said floor, means located at the discharge end of said tunnel for forcing a cooling medium first through said horizontal passages, thence upwardly through said vertical passages for cooling the ware, means for delivering a portion of the heated cooling medium to said combustion chamber in a series of jets in such manner as to support combustion and to produce recirculating eddy currents in said combustion chamber, means for delivering a portion of the heated products of combustion from said combustion chamber to the heating zone and first downwardly through the ware, thence outwardly through the horizontal passages of said floor, suction means for removing said products of combustion, means for delivering a portion of the heated cooling medium to said preheating zone, means for producing eddy currents in said preheating zone caused by the said medium entering said zone, and means for exhausting the medium after it has become cooled.

6. In a device of the class described, a kiln including preheating and cooling zones, means for advancing ware through said zones, means for forcing a cooling medium through said cooling zone, means for conveying a portion of the heated cooling medium to said preheating zone, said preheating zone including means for introducing said portion of heated cooling medium in the form of jets substantially parallel and adjacent to the top and across the whole top of said preheating zone to create recirculating eddy currents in said zone, for the purposes stated.

7. In a device of the class described, a kiln tunnel, means for advancing ware through said tunnel, the ware being arranged in such manner as to form vertical passages, said tunnel including a combustion zone and a cooling zone, means for circulating a cooling medium under pressure progressively through a series of upward movements, means for supplying fuel to said combustion chamber, and means for introducing a portion of the heated cooling medium into said combustion chamber in a series of jets parallel and adjacent to the top and across the whole top of said combustion chamber to support combustion of the fuel, and in such manner as to create recirculating eddy currents of the products of combustion upwardly through the ware being treated.

8. In a device of the class described, a kiln tunnel including a combustion chamber, means for advancing ware through said combustion chamber, said combustion chamber being provided with a heating chamber above and on each side of said ware, the ware being stacked so as to form vertical passages, means for introducing fuel to the upper portion of said heating chamber, means for introducing heated air through horizontally arranged nozzles, said nozzles being above the ware at one end of the combustion chamber, the heated air being introduced to support combustion of said fuel and to cause the combustible gases to be forced longitudinally over the top of the ware to near the opposite end of the combustion chamber from the nozzle end, thence downwardly through the ware near the last said end of the said chamber and to cause the heated gases to then move upwardly through that portion of the ware adjacent to the nozzles through induction.

9. In combination, a kiln tunnel, a series of ware bearing cars adapted to travel longitudinally through said tunnel, said car being designed to support and carry ware to be burned, said ware being arranged to form vertical passages terminating in horizontal transverse passages at their lower ends, means for forcing a cooling medium through said horizontal passages from each end and then upwardly through the vertical passages as the ware is being cooled.

Des Moines, Iowa, April 2, 1925.

HALVER R. STRAIGHT.